United States Patent [19]
Lee et al.

[11] Patent Number: 5,759,688
[45] Date of Patent: Jun. 2, 1998

[54] SILICON CARBIDE FIBER REINFORCED CARBON COMPOSITES

[75] Inventors: Sam Lee, Gardena; Paul V. Mosher, Redondo Beach, both of Calif.

[73] Assignee: SGL Carbon Composites, Inc., Gardena, Calif.

[21] Appl. No.: 131,013

[22] Filed: Oct. 1, 1993

Related U.S. Application Data

[63] Continuation of Ser. No. 642,097, Jan. 16, 1991, abandoned.

[51] Int. Cl.$^6$ ........................................ B32B 9/00
[52] U.S. Cl. .................... 428/408; 428/366; 428/367; 428/378; 428/379; 428/446; 428/698; 428/699; 428/704; 428/908.8
[58] Field of Search ..................... 428/408, 688, 428/704, 908.8, 378, 379, 698, 699, 366, 367, 446; 501/90, 99; 427/122; 252/502, 503, 504, 506, 507

[56] References Cited

U.S. PATENT DOCUMENTS

| | | | |
|---|---|---|---|
| 3,416,951 | 12/1968 | Hough | 117/106 |
| 3,462,289 | 8/1969 | Rohl et al. | 117/46 |
| 3,676,293 | 7/1972 | Gruber | 428/408 |
| 3,897,582 | 7/1975 | Olcott | 428/114 |
| 3,925,133 | 12/1975 | Olcott | 156/175 |
| 3,925,577 | 12/1975 | Fatzer et al. | 427/249 |
| 3,969,124 | 7/1976 | Stewart | 106/56 |

(List continued on next page.)

FOREIGN PATENT DOCUMENTS

| | | |
|---|---|---|
| 0127491 | 4/1984 | European Pat. Off. |
| 290322 | 4/1988 | European Pat. Off. |
| 0 346 875 | 6/1989 | European Pat. Off. |
| 61-026563 | 2/1986 | Japan . |
| 61-146776 | 7/1986 | Japan . |
| 61-038231 | 8/1986 | Japan . |
| 61-197473 | 9/1986 | Japan . |
| 1-264964 | 10/1989 | Japan . |

OTHER PUBLICATIONS

"Synthesis and properties of new composite materials for high temperature applications based on carbon fibers and C-SiC or C-TiC hybrid matrices" by Naslain et al., *Revue de Chimie minéale*, pp. 544–564 (1981).

"Properties of Silicon Carbide Fiber Reinforced Carbon Composites" by Schwartz et al., AD–vol. 25–1, Damage and Oxidation Protection in High Temperature Composites—vol. 1, pp. 23–33 (1991).

(List continued on next page.)

*Primary Examiner*—Timothy Speer
*Attorney, Agent, or Firm*—Renner, Kenner, Greive, Bobak, Taylor & Weber

[57] ABSTRACT

The present invention provides an article comprising a plurality of silicon carbide containing fibers in an inhibited carbon matrix.

The present invention also provides a shaped material for structural applications comprising a plurality of silicon carbide containing fibers in a carbon matrix formed by impregnating said fibers with an organic resin and staging to form a prepreg, shaping and curing said prepreg to form a laminate, carbonizing said shaped laminate to form a carbonized part, and densifying said carbonized part by chemical vapor infiltration to form a component.

The present invention further provides a process for producing a reinforced component comprising:

(a) impregnating a plurality of silicon carbide fibers with an oxidation inhibiting filler-containing organic resin,
(b) staging said impregnated fibers to partially cure said resin to form a prepreg,
(c) shaping and curing said prepreg to form a laminate,
(d) converting said resin in the laminate to carbon to form a carbonized part,
(e) densifying said carbonized part by chemical vapor infiltration to form the component.

58 Claims, 7 Drawing Sheets

U.S. PATENT DOCUMENTS

| | | | |
|---|---|---|---|
| 4,119,189 | 10/1978 | Ehrenreich | 192/107 M |
| 4,178,413 | 12/1979 | DeMunda | 428/408 |
| 4,275,095 | 6/1981 | Warren | 427/228 |
| 4,321,154 | 3/1982 | Ledru | 252/62 |
| 4,407,969 | 10/1983 | Widener et al. | 501/95 |
| 4,425,407 | 1/1984 | Galasso et al. | 428/368 |
| 4,472,476 | 9/1984 | Veltri et al. | 428/215 |
| 4,476,178 | 10/1984 | Veltri et al. | 428/215 |
| 4,487,799 | 12/1984 | Galasso et al. | 428/334 |
| 4,507,354 | 3/1985 | Ishikawa et al. | 428/245 |
| 4,618,529 | 10/1986 | Yamamura et al. | 428/224 |
| 4,618,591 | 10/1986 | Okamura et al. | 501/90 |
| 4,642,271 | 2/1987 | Rice | 428/698 |
| 4,671,997 | 6/1987 | Galasso et al. | 428/408 |
| 4,726,980 | 2/1988 | Ishikawa et al. | 428/212 |
| 4,748,079 | 5/1988 | Thebault | 428/288 |
| 4,752,503 | 6/1988 | Thebault | 427/248.1 |
| 4,771,021 | 9/1988 | Tamamizu et al. | 501/90 |
| 4,863,798 | 9/1989 | Arenz et al. | 428/368 |
| 4,889,088 | 12/1989 | Berger | 123/188 B |
| 4,894,286 | 1/1990 | Gray | 428/408 |
| 4,928,645 | 5/1990 | Berneburg et al. | 123/188 A |
| 4,958,998 | 9/1990 | Yamauchi | 252/504 |
| 4,998,879 | 3/1991 | Foster | 432/253 |
| 5,051,300 | 9/1991 | Rousseau | 428/408 |
| 5,079,039 | 1/1992 | Heraud et al. | 427/249 |
| 5,102,698 | 4/1992 | Cavalier et al. | 427/376.1 |
| 5,106,687 | 4/1992 | Tanino et al. | 428/141 |
| 5,132,145 | 7/1992 | Valentian | 427/249 |
| 5,209,950 | 5/1993 | Schwartz et al. | 427/252 |
| 5,222,866 | 6/1993 | LaBrouche et al. | 416/230 |
| 5,228,175 | 7/1993 | Olry et al. | 28/168 |
| 5,296,171 | 3/1994 | Christin et al. | 264/22 |
| 5,362,567 | 11/1994 | Washburn | 428/408 |

OTHER PUBLICATIONS

"Properties of Silicon Carbide Fiber Reinforced Carbon Composites" by Schwartz et al., BP Chemicals (HITCO) Inc., 10 pages.ASME Presentation, (Jan. 1991).

"Ceracarb™ SiC/C Composites" by Schwartz et al., BP Chemicals (HITCO) Inc., 19 pages.IDA Conference Presentation, (Oct. 1991).

Prewo, K.M., "Fiber–Reinforced Ceramics: New opportunities for composite materials" *Ceramic Bulletin* vol. 68, No. 2, 1989 pp. 395–400.

Davis, H.O. Materials and Process Development for Advanced Composites at Kaiser Aerotech pp. 283–289.

Research Disclosure 290054 A, Jun. 10, 1988.

Okura, A., et al., "SIC Fiber Reinforced Carbon Matrix Composites", *19th International SAMPE Technical Conference Proceedings* pp. 721–728 (1987).

Johnson III, W.L. et al, "Comparison of Matrix Variation in Nicalon (SIC) Fiber Reinforced Composites", *Mat. Res. Soc. Symp. Proc.* vol. 78, pp. 215–222 (1987).

Strife, J.R. et al, "Ceramic Coatings for Carbon–Carbon Composites" *Ceramic Bulletin* vol. 67, No. 2, 1988 (p. 369.

Sheehan, J.E. "Oxidation Resistant Carbon–Carbon Composites" (Journal unknown).

SILICON CARBIDE FIBER REINFORCED CARBON COMPOSITES

This application is a continuation of application Ser. No. 07/642,097, filed Jan. 16, 1991 now abandoned.

FIELD OF THE INVENTION

The present invention relates to silicon carbide/carbon composites (SiC/C) in which SiC fibers are placed within a carbonaceous matrix to yield light weight materials with high strength, thermal stability, toughness and oxidation resistance.

BACKGROUND OF THE INVENTION

Refractory, oxidation resistant silicon carbide reinforced composites are most commonly made by the chemical vapor infiltration of silicon carbide (SiC) fiber preforms with silicon carbide. Also known are reaction bonding and hot-pressing/sintering methods of preparation.

Chemical vapor infiltration (CVI) techniques utilizing SiC have several limitations. Firstly, temperature and/or pressure gradients, which place inherent limitations on the fabrication of parts with complex shapes and geometries, are often employed in order to achieve acceptable densification. Secondly, the method is limited to relatively low fiber volumes (less than 45%) and specific fiber architectures. Thirdly, fiber coatings, which add cost and may be prone to oxidation, are often used in order to obtain strength and toughness.

Reaction bonding and hot-pressing/sintering methods have similar problems. Reaction bonding methods require the use of very high temperatures which may degrade the SiC fibers. Good strength and toughness are difficult to achieve by reaction bonding without the use of fiber coatings. Hot-pressing techniques also require the use of very high temperatures and place severe limits on the fabrication of complex shapes.

SUMMARY OF THE INVENTION

The present invention allows for the net shape production of large, complex structures which are strong, tough, oxidation resistant and maintain their mechanical properties at high temperatures, even in excess of 2000° F.

The present invention provides an article comprising a plurality of silicon carbide containing fibers in an inhibited carbon matrix.

The present invention also provides a shaped material for structural applications comprising a plurality of silicon carbide containing fibers in a carbon matrix formed by impregnating said fibers with an organic resin and staging to form a prepreg, shaping and curing said prepreg to form a laminate, carbonizing said shaped laminate to form a carbonized part, and densifying said carbonized part by chemical vapor infiltration to form a component.

The present invention further provides a process for producing a reinforced component comprising:

(a) impregnating a plurality of silicon carbide fibers with an oxidation inhibiting filler-containing organic resin, (b) staging said impregnated fibers to partially cure said resin to form a prepreg, (c) shaping and curing said prepreg to form a laminate, (d) converting said resin in the laminate to carbon to form a carbonized part, (e) densifying said carbonized part by chemical vapor infiltration to form the component.

DETAILED DESCRIPTION OF THE INVENTION

The present invention provides lightweight, strong, tough, and oxidation-resistant composites which maintain their properties even after prolonged high-temperature exposure. The SiC reinforced composites of this invention are particularly useful in those applications which require materials capable of withstanding high stresses at temperatures up to 1400° C. The net shape fabricability and the ability of the composites to be processed unrestrained permits the production of parts with a wide variety of sizes, shapes and configurations.

Examples of utility for such SiC/C composites are structural components for aero engines such as flaps, seals, and liners; turbine rotors and structural parts for hypersonic vehicles such as bolts, fasteners, skins and leading edges. The SiC/C composites of the present invention may also be used as thermal protection materials, such as thermal protection anchorage panels.

The process for manufacturing the SiC/C composites of the present invention is as follows. Continuous SiC ceramic fibers are impregnated with a thermosetting resin containing fillers. The fibers are then staged in an oven at about 40°–120° C. to remove solvents and partially cure the resin. The staged fibers are cut, laid-up as desired, and prepared for molding. The fibers can be molded in an hydraulic press or in an autoclave by conventional procedures for curing phenolic or epoxy laminates. The molded part is then heat-treated at temperatures from about 800°–1400° C. in an inert environment to convert the organic matrix to carbon. The carbonized part is then subjected to a carbon CVI for densification.

SiC fibers usable in this invention include, but are not limited to, Nicalon, Nippon Carbon's SiC filament; Tyranno, Ube Industries' SiC filament; HPZ, Dow Cornings' Si—C—N filament; Fiberamic, Rhone-Poulenc's Si—C—N filament; Carborundum's polycrystalline SiC filament; Sigma fiber, British Petroleum's SiC monofilament; and SCS-6, Textron's SiC monofilament. They may take the form of cloth, chopped cloth, yarn, chopped yarn, and tape. SiC yarns may be woven into desired shapes by braiding or by multidirectional weaving.

Impregnation of the fibers can take place before or after weaving. The yarn, cloth, and/or tape may be laid flat on a tool and stacked to form a layered reinforcement with the fibers aligned in one or in several directions in the lamina plane. The yarn, cloth, and/or tape may be wrapped or wound around a mandrel to form a variety of shape and reinforcement orientations. Fiber volumes in the laminate can range from about 10 to about 60% but preferably range from about 35 to about 50%. By utilizing impregnated cloths and the like, it is possible to produce structures of complex shapes with a very high degree of fiber orientation and alignment.

The slurries used to impregnate the fibers comprise phenolic, epoxy, or furan resins containing dispersed filler(s). Representative phenolics include, but are not limited to, those supplied under the trademark SC1008 by Borden Inc. and 134A by Ironsides Inc. Representative epoxies include, but are not limited to, those supplied by Shell Chemical Company under the trademarks Epon 820 and Epon 828. Representative furans include, but are not limited to, those supplied by Q. 0. Chemicals Inc. under the trademarks UP 520 and LP 520.

The filler(s) used include, but are not limited to, carbon, boron, boron carbide, boron nitride, silicon, silicon carbide, silicon nitride, silicon tetraboride, silicon hexaboride, titanium diboride, and zirconium diboride, either alone or in combination. Filler volumes in the composite can range from about 2% to about 25%.

The carbon matrices of the composites of the present invention preferably contain fillers that act as inhibitors to improve oxidation resistance. These include silicon, boron and the boron containing fillers mentioned above, as well as other boron containing compounds such as refractory metal borides, including those of hafnium, vanadium, niobium, tantalum, chromium, molybdenum and tungsten. Volumes of inhibitor in the matrix may range from 2% to 25%.

The heat-treatment schedule used to carbonize the organic resin must be slow enough so as not to generate volatiles within the part too quickly, which could cause delaminations. The temperature must be sufficiently high to convert the resin to predominantly carbon without thermally degrading the reinforcing fibers. Typically, molded parts are brought from ambient to 1000°–1300° C. in 50–250 hours.

Chemical vapor infiltration (CVI) is conducted after the composites undergo carbonization, or pyrolysis. One or more infiltrations are required for optimum strength and oxidation resistance. The first CVI is preferably with carbon; subsequent CVI's can be carried out with carbon or SiC, but at least one CVI should be with carbon. Carbon CVI may be conducted with low molecular weight alkanes or alkenes such as methane, ethane, propane, propene, or mixtures thereof such as natural gas at about 800°–1200° C. and a pressure of about 5 to 50 torr. SiC CVI may be conducted with methane and silane such as silicon tetrachloride, or with an organosilane such as methyltrichlorosilane, dimethyldichlorosilane, methyldichlorosilane or their mixtures at about 900°–1200° C. and a pressure of about 2–200 torr.

Carbon, boron nitride, or other coatings can be applied to the fibers to improve the composite's strength and toughness. The coatings should be of a low modulus material layer that can interrupt crack propogation from the matrix into the fiber. Fiber coatings can be applied by chemical vapor deposition, electrochemical, wet chemical, or slurry methods. The fiber coating may be applied directly to the yarn and/or fabric before it is impregnated or in situ after the composite has been heat treated (carbonized).

Figure 1:
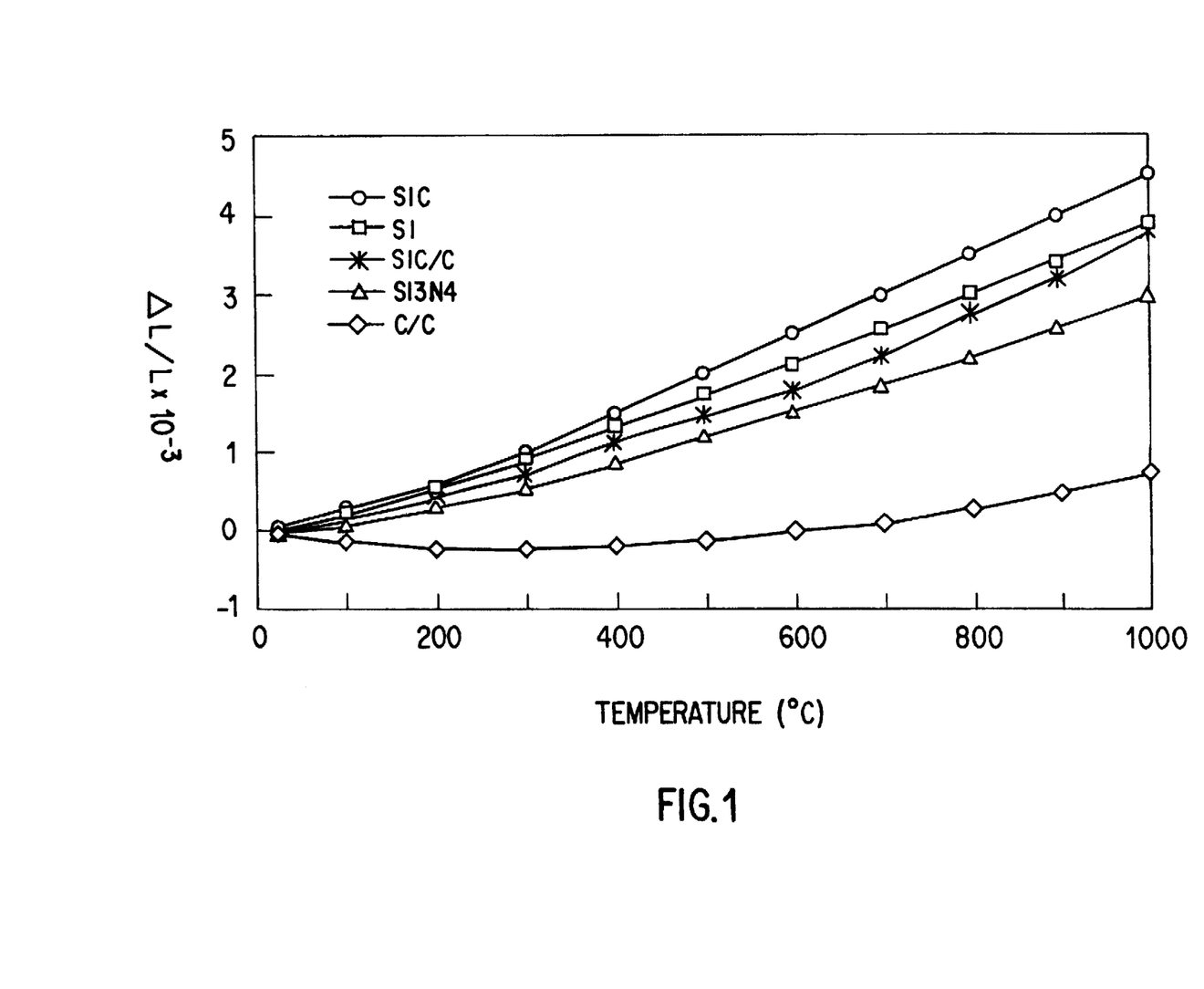
FIG. 1 is a thermal expansion graph demonstrating the change in length divided by the length times $1 \times 10^{-3}$ versus temperature for various materials including SiC/C composites according to the present invention.

Ceramic coatings can be applied to components made from the composites of this invention. Useful coatings include: silicon, silicon carbide, silicon nitride, silicon triboride, silicon tetraboride, silicon hexaboride, boron carbide, and oxides such as aluminum phosphate, aluminum silicates, or borosilicates, and combinations of the above. Preferred is a silicon carbide coating and other coatings having a coefficient of thermal expansion match with the silicon carbide containing fibers. FIG. 1 demonstrates the close match in thermal expansion of inorganic coatings with SiC/C composites as compared to C/C composites. Methods used to apply the above coatings may include known chemical vapor deposition, physical vapor deposition, plasma or flame spraying, solgel and slurry methods.

SiC/C composites according to the present invention have yielded materials with chemical and mechanical properties that would not be expected by those well versed in the material science field. Typical mechanical properties of the 2D (reinforced in 2 dimensions) SiC/C materials are shown in Table 1. The interlaminar tensile strength of composites of this invention have exceeded 4000 PSI and the interlaminar shear strength has exceeded 7000 PSI. These values are at least twice that of 2D carbon/carbon (C/C) composites. The interlaminar shear strengths of these composites are greater than any prior carbon or SiC CVI densified composites of which we are aware. The notched izod impact strengths, which are commonly used to gauge toughness, have often exceeded 3 ft-lbs/in, indicating these composites are 10–100 times more resistant to catastrophic failure than monolithic ceramics.

The oxidation resistance of the materials of the present invention is significantly greater than the best inhibited C/C materials and in many instances better than SiC/SiC composites having fibers with carbon coatings. The inherent oxidation resistance of the inhibited matrix composites is exemplified by the retention of over 75% of their flexural strength after 100 hours of exposure in air at 2200° F, as shown in Table 1. Uninhibited as well as inhibited matrix SiC/C composites demonstrate mechanical properties suitable for structural applications. Enhanced oxidation resistance may be imparted to these composites by the use of coatings, discussed above.

TABLE 1

Mechanical Properties of SiC/C Composites

| Type | 2200° Exposure Time in Air (Hours) | Tensile Strength (KSI) | Flexural Strength (KSI) | Interlaminar Tension (PSI) | Interlaminar Shear (PSI) | Izod Impact Strength Ft-Lbs/In |
|---|---|---|---|---|---|---|
| A | None | 30 | 44 | 3200 | 6500 | 1.5 |
| B | 100 | 27 | 34 | 1920 | 6200 | — |
| C | None | 40 | 60 | 2900 | 5600 | 3 |
| D | None | 45 | 62 | 3200 | 4900 | 10 |
| E | None | 51 | 72 | 3200 | 6000 | 8.5 |

A - Inhibited SiC/C (boron carbide filler)
B - Inhibited SiC/C (boron carbide filler)
C - Moderately Inhibited SiC/C (carbon and boron carbide fillers)
D - Uninhibited SiC/C (carbon filler)
E - Coated-Fiber Inhibited SiC/C (boron carbide filler)

Although the precise phenomena responsible for the extraordinary properties displayed by these composites are not known, from our analysis we have theorized several contributing factors. The high interlaminar properties are believed to result from the substantial amount of infiltrated pyrolytic carbon present in and around the SiC fiber bundle. The pyrolytic carbon may lock the fibers into the matrix and enhance load transfer without bonding so strongly to the fibers as to cause brittle behavior. The favorable match in the modulus and thermal expansion of the SiC fiber and the pyrolytic carbon may be a factor that results in reduced matrix cracking during fabrication and thermal cycling. The resistance to oxidation shown by the composites of this invention can be attributed to the formation of a glassy layer, or oxide scale, on the surface of the composite which protects the carbon phases within the matrix upon high temperature exposure to oxygen. For example, when boron carbide is used as a filler for the resin, a borosilicate layer has been observed. When a metal boride is utilized, the layer may include a borosilicate of that metal.

EXAMPLES

Example 1 one sheet of 40-inch by 39-inch Nicalon 8 harness satin fabric was impregnated with 571g of a slurry consisting of 16% carbon powder, 50% Ironsides 134A (phenolic resin) and 33.3% ethanol. The sheet was placed in a circulating oven and staged for 60 minutes at 180° F. The staged fabric was then cut into twelve 12-inch by 13-inch plies and then stacked in a manner such that all of the warp fibers were aligned. The plies were then sandwiched between two metal plates and sealed in a plastic bag with an exhaust outlet. The part was then placed in an autoclave and the exhaust outlet was connected to a vacuum. The autoclave was pressurized to 150 PSI, brought to 310° F. within 4 hours and held at 310° F. for an additional 3 hours. The autoclave was then cooled and the consolidated plies were removed. The composite was then placed in a furnace and brought to 1000° F. in 260 hours in nitrogen. The partially carbonized panel was then removed and placed in another furnace and brought to 1850° F. in 15 hours in argon. The carbonized panel was then infiltrated once with pyrolytic carbon via a CVI process. The resulting SiC/C composite possessed an average interlaminar shear strength of 2600 PSI, an interlaminar tensile strength of 600 PSI, and a flexural strength of 37 KSI.

Example 2

Ten sheets of 18-inch by 9.5-inch Nicalon 8 harness satin fabric were impregnated with 820 g of a slurry consisting of 11% amorphous boron powder, 49% Ironsides 134A (phenolic resin), and 40% ethanol. The sheets were then placed in a circulating oven and staged for 60 minutes at 180° F. and 30 minutes at 200° F. The staged plies were then stacked in a manner such that all of the warp fibers were aligned. The plies were then sandwiched between two metal plates and sealed in a plastic bag with an exhaust outlet. The part was then placed in an autoclave and the exhaust outlet was connected to a vacuum. The autoclave was pressurized to 150 PSI, brought to 310° F. within 4 hours and held at 310° F. for an additional 3 hours. The autoclave was then cooled and the consolidated plies were removed. The composite was then placed in a furnace and brought to 1000° F. in 260 hours in nitrogen. The partially carbonized composite was removed and placed in another furnace and brought to 1850° over a 15 hour period in an argon environment to complete the carbonization process. The carbonized panel was then infiltrated 2 times with pyrolytic carbon via a CVI process. The resulting inhibited SiC/C composite possessed an average interlaminar tensile strength of 2300 PSI and a flexural strength of 23 KSI.

Example 3

One sheet of 21-inch by 39-inch Nicalon 8 harness satin fabric was impregnated with 310 g of a slurry consisting of 13.2% boron carbide powder, 37.8% Ironsides 134A (phenolic resin), and 49.0% ethanol. The sheet was then placed in a circulating oven and staged for 60 minutes at 180° F. The staged fabric was then cut into eight 10-inch by 10-inch plies and then stacked in a manner such that all of the warp fibers were aligned. The plies were then sandwiched between two metal plates and sealed in a plastic bag with an exhaust outlet. The part was then placed in an autoclave and the exhaust outlet was connected to a vacuum. The autoclave was pressurized to 150 PSI, brought to 310° F. within 4 hours and held at 310° F. for an additional 3 hours. The autoclave was then cooled and the consolidated plies were removed. The composite was then placed in a furnace and brought to 1850° F in 184 hours in argon. The carbonized panel was then infiltrated 2 times with pyrolytic carbon via a CVI process. The resulting inhibited SiC/C composite possessed an average interlaminar shear strength of 7200 PSI, an interlaminar tensile strength of about 3500 PSI, a flexural strength of 40 KSI, and a notched izod impact strength of about 2 ft-lbs/inch. Coupons from this panel were found to retain over 75% over their flexural properties after 100 hours of exposure in air at 2200° F.

Example 4 one sheet of 21-inch by 39-inch Nicalon 8 harness satin fabric was impregnated with 345g of a slurry consisting of 14.2% silicon hexaboride powder, 35.7% Ironsides 134A (phenolic resin), and 50.1% ethanol. The sheet was then placed in a circulating oven and staged for 60 minutes at 180° F. The staged fabric was then cut into eight 10-inch by 10-inch plies and then stacked in a manner such that all of the warp fibers were aligned. The plies were then sandwiched between two metal plates and sealed in a plastic bag with an exhaust outlet. The part was then placed in an autoclave and the exhaust outlet was connected to a vacuum. The autoclave was pressurized to 150 PSI, brought to 310° F. within 4 hours and held at 310° F. for an additional 3 hours. The autoclave was then cooled and the consolidated plies were removed. The composite was then placed in a furnace and brought to 1850° F. in 184 hours in argon. The carbonized panel was then infiltrated 2 times with pyrolytic carbon via a CVI process. The resulting inhibited SiC/C composite possessed an average interlaminar shear strength of 2800 PSI, an interlaminar tensile strength of 2100 PSI, and a flexural strength of 25 KSI.

Example 5

One sheet of 16-inch by 39-inch and one sheet of 16-inch by 7.5 inch Nicalon 8 harness satin fabric were impregnated with 266 g of a slurry consisting of 8.8% boron carbide powder, 6.3% carbon powder, 50.2% Ironsides 134A (phenolic resin), and 34.6% ethanol. The sheets were then placed in a circulating oven and staged for 60 minutes at 180° F. The staged sheets were then cut into 7.5-inch by 7.5-inch plies which were stacked in an alternating pattern such that half of the warp fibers were aligned in the "x" direction and the other half were aligned perpendicular to the "x" direction. The plies were then sandwiched between two metal plates and sealed in a plastic bag with an exhaust outlet. The part was then placed in an autoclave and the exhaust outlet was connected to a vacuum. The autoclave was pressurized to 150 PSI, brought to 310° F. within 4 hours and held at 310° F. for an additional 3 hours. The autoclave was then cooled and the consolidated plies were removed. The composite was placed in a furnace and brought to 1850° F. in 184 hours in argon. The carbonized panel was then infiltrated once with pyrolitic carbon via a CVI process. The resulting inhibited SiC/C composite possessed an average interlaminar tensile strength of 2900 PSI, an interlaminar shear strength of 5600 PSI, a flexural strength of 63 KSI, and a notched izod impact strength of over 3 ft-lbs/inch.

Example 6

One sheet of 21-inch by 39-inch Nicalon 8 harness satin fabric was impregnated with 272 g of a slurry consisting of 11.2% boron carbide powder, 34.1% Ironsides 134A (phenolic resin) and 54.7% ethanol. the sheet was then placed in a circulating oven and staged for 60 minutes at 180° F. The staged sheet was cut into 10-inch by 10-inch plies and the plies were then stacked in a manner such that all of the warp fibers were aligned. The plies were then sandwiched between two metal plates and sealed in a plastic bag with an exhaust outlet. The part was then placed in an autoclave and the exhaust outlet was connected to a vacuum. The autoclave was pressurized to 150 PSI, brought to 310° F. within 4 hours and held at 310° F. for an additional 3 hours. The autoclave was then cooled and the consolidated plies were removed. The composite was then placed in a furnace and brought to 1850° F in 184 hours in argon. The carbonized panel was then infiltrated once with pyrolytic carbon via a CVI process. The resulting inhibited SiC/C composite possessed an average interlaminar shear strength of 5600 PSI, an interlaminar tensile strength of 2500 PSI, a flexural strength of 54 KSI, and a notched izod impact strength of 2 ft-lbs/inch.

Example 7

One sheet of 20-inch by 39-inch Nicalon 8 harness satin fabric was impregnated with 278 g of a slurry consisting of 10.7% carbon powder, 53.3% Ironsides 134A (phenolic resin) and 36.0% ethanol. The sheet was then placed in a circulating oven and staged for 60 minutes at 180° F. The staged sheet was then cut into 10-inch by 10-inch plies and the plies were stacked in a manner such that all of the warp fibers were aligned. The piles were then sandwiched between two metal plates and sealed in a plastic bag with an exhaust outlet. The part was then placed in an autoclave and the exhaust outlet was connected to a vacuum. The autoclave was pressurized to 150 PSI, brought to 310° F. within 4 hours and held at 310° F. for an additional 3 hours. The autoclave was then cooled and the consolidated plies were removed. The composite was then placed in a furnace and brought to 1850° F in 184 hours in argon. The carbonized panel was then infiltrated once with pyrolytic carbon via a CVI process. The resulting SiC/C composites possessed an average interlaminar shear strength of about 5500 PSI, an interlaminar tensile strength of 3700 PSI, an in-plane tensile strength of 52 KSI, a flexural strength of 70 KSI, and a notched izod impact strength of 10 ft-lbs/inch.

Example 8

A sheet of 4.5-inch by 40-inch Nicalon 8 harness satin fabric was impregnated with 65.2 g of a slurry consisting of 14.8% silicon powder, 13.5% silicon carbide powder, 0.5% amorphous boron powder, 30.6% Shell's Epon 828 with a boron trifluoride catalyst (epoxy resin), and 40.6% methyl ethyl ketone. The sheets were then placed in a circulating oven for 60 minutes at 200° F. The staged sheet was then cut into eight 4.5-inch by 4.5-inch plies. The plies were stacked in a manner such that all of the warp fibers were aligned. The plies were then sandwiched between two metal plates and sealed in a plastic bag with an exhaust outlet. The part was then placed in an autoclave and the exhaust outlet was connected to a vacuum. The autoclave was pressurized to 280 PSI, brought to 350° F. within 1 hour and held at 350° F. for an additional hour. The autoclave was then cooled and the consolidated plies were removed. The composite was then placed in a furnace and brought to 1500° F. in 72 hours in argon. The partially carbonized panel was then heat-treated to 2200° F. in 10 hours in argon. The carbonized panel was then infiltrated with pyrolytic carbon and then subjected to an additional heat-treatment up to 2575° F. within 10 hours. The panel then underwent an additional CVI with carbon followed by a CVI with SiC. The resulting inhibited SiC/C composite possessed an interlaminar tensile strength of 1100 PSI, and a flexural strength of 12 KSI.

Example 9

Two sheets of 5-inch by 6-inch Dow Corning's HPZ 8 harness satin fabric were impregnated with 7.6 g of a slurry consisting of 14.5% boron carbide powder, 46.1% Ironsides 134A (phenolic resin), and 39.5% ethanol. The sheets were then placed in a circulating oven and staged for 30 minutes at 180° F. The staged plies were then stacked in a manner such that all of the warp fibers were aligned. The plies were then sandwiched between two metal plates and sealed in a plastic bag with an exhaust outlet. The part was then placed in an autoclave and the exhaust outlet was connected to a vacuum. The autoclave was pressurized to 150 PSI, brought to 310° F within 4 hours and held at 310° F. for an additional 3 hours. The autoclave was then cooled and the consolidated plies were removed. The composite was then placed in a furnace and brought to 1850° F. in 184 hours in argon. The carbonized panel was then infiltrated once with pyrolytic carbon via a CVI process. The resulting inhibited SiC/C composite possessed an interlaminar tensile strength of 1900 PSI, and a tensile strength of 13 KSI.

Example 10

One sheet of 21-inch by 39-inch Nicalon 8 harness satin fabric was impregnated with 409 g of a slurry consisting of 31.1% titanium diboride powder, 37.3% Ironsides 134A (phenolic resin), and 31.7% ethanol. The sheet was then placed in a circulating oven and staged for 60 minutes at 180° F. The staged fabric was then cut into eight 10-inch by 10-inch plies and the plies were then stacked in a manner such that all of the warp fibers were aligned. The plies were then sandwiched between two metal plates and sealed in a plastic bag with an exhaust outlet. The part was then placed in an autoclave and the exhaust outlet was connected to a vacuum. The autoclave was pressurized to 150 PSI, brought to 310° F. within 4 hours and held at 310° F. for an additional 3 hours. The autoclave was then cooled and the consolidated plies were removed. The composite was then placed in a furnace and brought to 1850° F. in 184 hours in argon. The carbonized panel was then infiltrated 2 times with pyrolytic carbon via a CVI process. The resulting inhibited SiC/C composite possessed an average interlaminar shear strength of 3800 PSI, an interlaminar tensile strength of 1000 PSI, and a flexural strength of 27 KSI.

Example 11

Three sheets of 3.8-inch by 6.3-inch 8 harness satin fabric woven from Carborundum's polycrystalline SiC fibers were impregnated with 84 g of a slurry consisting of 7.4% boron carbide powder, 5.2% carbon powder, 41.9% Ironsides 134A (phenolic resin), and 45.5% ethanol. The sheets were placed in a circulating oven and staged for 60 minutes at 180° F. The staged sheets were then cut in three 2.8-inch by 6.2 inch plies and three 0.9-inch by 6.2-inch plies and then stacked in a manner such that all of the warp fibers were aligned with the three narrower pieces butted together to form a fourth 2.8-inch by 6.2-inch ply. The plies were then sandwiched between two metal plates and sealed in a plastic bag with an exhaust outlet. The part was then placed in an autoclave and the exhaust outlet was connected to a vacuum. The autoclave was pressurized to 150 PSI, brought to 310° F. within 4 hours and held at 310° F. for an additional 3 hours. The autoclave was then cooled and the consolidated plies were removed. The composite was then placed in a furnace and brought to 1850° F. in 184 hours in argon. The carbonized panel was then infiltrated once with pyrolytic carbon via a CVI process. The resulting inhibited SiC/C composite possessed an interlaminar tensile strength of 600 PSI, and a flexural strength of 15 KSI.

Example 12

One sheet of 40-inch by 39-inch Tyranno 8 harness satin fabric was impregnated with 559 g of a slurry consisting of 15.1% boron carbide powder, 45.9% Ironsides 134A (phenolic resin), and 39.0% ethanol. The sheet was then placed in a circulating oven and staged for 60 minutes at 180° F. The staged fabric was then cut into eight 10-inch by 10-inch plies which were stacked in an alternating pattern such that half of the warp fibers were aligned in the "x" direction and the other half were aligned perpendicular to the "x" direction. The plies were then sandwiched between two metal plates and sealed in a plastic bag with an exhaust outlet. The part was then placed in an autoclave and the exhaust outlet was connected to a vacuum. The autoclave was pressurized to 150 PSI, brought to 310° F. within 4 hours and held at 310° F. for an additional 3 hours. The autoclave was then cooled and the consolidated plies were removed. The composite was then placed in a furnace and brought to 1850° F. in 184 hours in argon. The carbonized panel was then infiltrated 2 times with pyrolytic carbon via a CVI process. The resulting inhibited SiC/C composite possessed an average interlaminar shear strength of 4300 PSI, an interlaminar tensile strength of 2500 PSI, and a flexural strength of 31 KSI.

Example 13

Eight 10-inch by 10-inch sheets of Nicalon 8 harness satin fabric were subjected to a 20-hour carbon CVD with methane in order to form a 0.8 micron pyrolytic carbon coating around each filament. The sheets were then impregnated with 336 g of a slurry consisting of 13.2% boron carbide powder, 37.8% Ironsides 134A (phenolic resin), and 49.0% ethanol. The sheets were then placed in a circulating oven and staged for 60 minutes at 180° F. The staged sheets were stacked in a manner such that all of the warp fibers were aligned. The plies were then sandwiched between two metal plates and sealed in a plastic bag with an exhaust outlet. The part was then placed in an autoclave and the exhaust outlet was connected to a vacuum. The autoclave was pressurized to 150 PSI, brought to 310° F. within 4 hours and held at 310° F. for an additional 3 hours. The autoclave was then cooled and the consolidated plies were removed. The resulting composite was then placed in a furnace and brought to 1850° F. in 184 hours in argon. The carbonized panel was then infiltrated 2 times with pyrolytic carbon via a CVI process. The resulting inhibited SiC/C composite possessed an average interlaminar shear strength of 5450 PSI, an interlaminar tensile strength of 3400 PSI, a tensile strength of 56 KSI, a flexural strength of 76 KSI, and a notched izod impact strength of 6.8 ft-lbs/inch.

Properties of SiC/C composites produced according to representative examples above are demonstrated in Table 2 below.

TABLE 2

|  | Example 3 Inhibited | Example 13 Inhibited | Example 7 Uninhibited |
| --- | --- | --- | --- |
| Orientation | Warp Aligned | Warp Aligned | Warp Aligned |
| Fiber Volume (%) | 45.0 | 39.8 | 44.2 |
| Bulk Density (g/cc) | 2.04 | 1.98 | 1.99 |
| In-Plane CTE (ppm/α F) | 7.1 | — | — |
| Tensile Strength (ksi) | 28.2 | 56.3 | 52.1 |
| Tensile Modulus (msi) | 11.6 | 8.1 | 8.8 |
| Compressive Strength (ksi) | 74.1 | 70.6 | 67.3 |
| Compressive Modulus (msi) | — | 9.1 | 10.1 |
| Interlaminar Shear Strength(psi) | 7210 | 5450 | 5460 |
| Cross-Ply Tensile Strength (psi) | 3460 | 3400 | 3700 |
| Izod Impact Strength (ft-lb/in) | 1.8 | 6.8 | 10.0 |

Figure 2A:
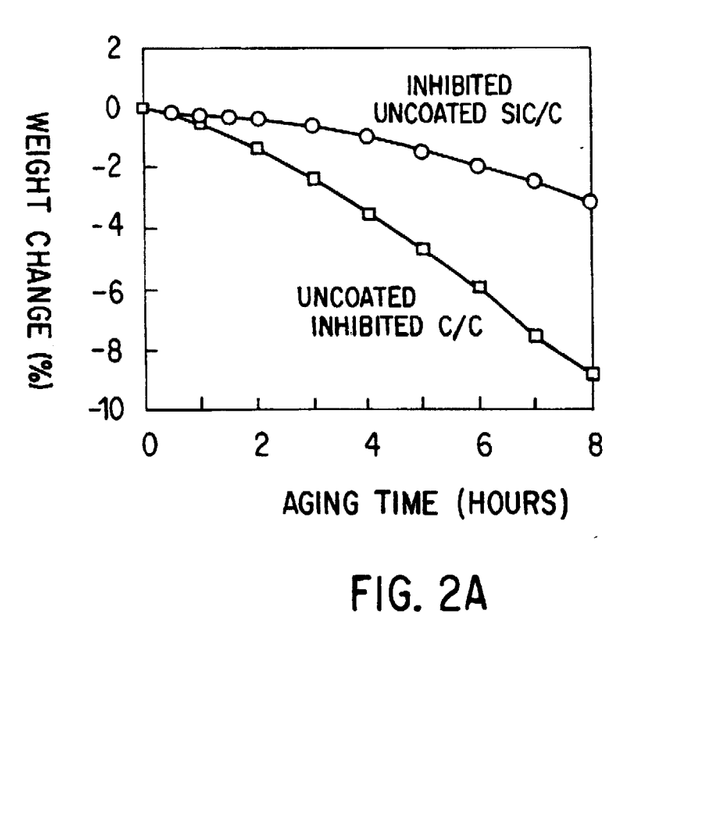
FIG. 2A is a graph demonstrating the weight change experienced over time by an uncoated, inhibited matrix SiC/C composite according to the present invention versus an uncoated, inhibited matrix carbon/carbon composite aged in air at 1200° F.
Figure 2B:
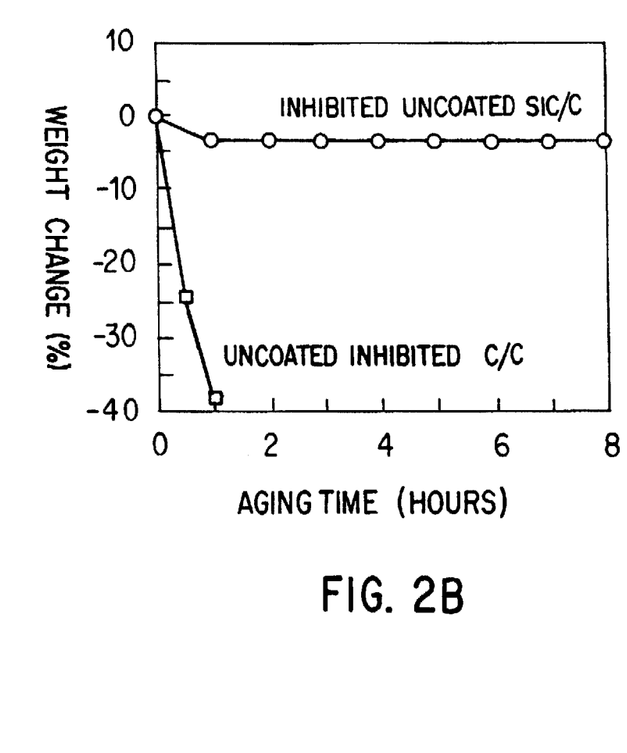
FIG. 2B is a graph demonstrating the weight change experienced over tme by an uncoated, inhibited matrix SiC/C composite according to the present invention versus an uncoated, inhibited matrix carbon/carbon composite aged in air at 2200° F.

The SiC/C composites of this invention therefore have significant advantages over conventional ceramic composites. Utilization of an inhibited carbon matrix provides all of the advantages that carbon has over ceramic matrices, such as thermal stability, elasticity and fabricability, while overcoming carbon's disadvantage—that of poor oxidation resistance. FIGS. 2A and 2B demonstrate the elevated temperature, oxidation resistance advantage of even uncoated, inhibited SiC/C composites versus uncoated, inhibited C/C composites in high temperature air aging tests. Weight loss is significantly reduced for SiC/C at temperatures of about 1200° F. and, even more dramatically, shows a plateauing effect at less than 5% loss at 2200° F. after about a one-hour exposure.

Figure 3:
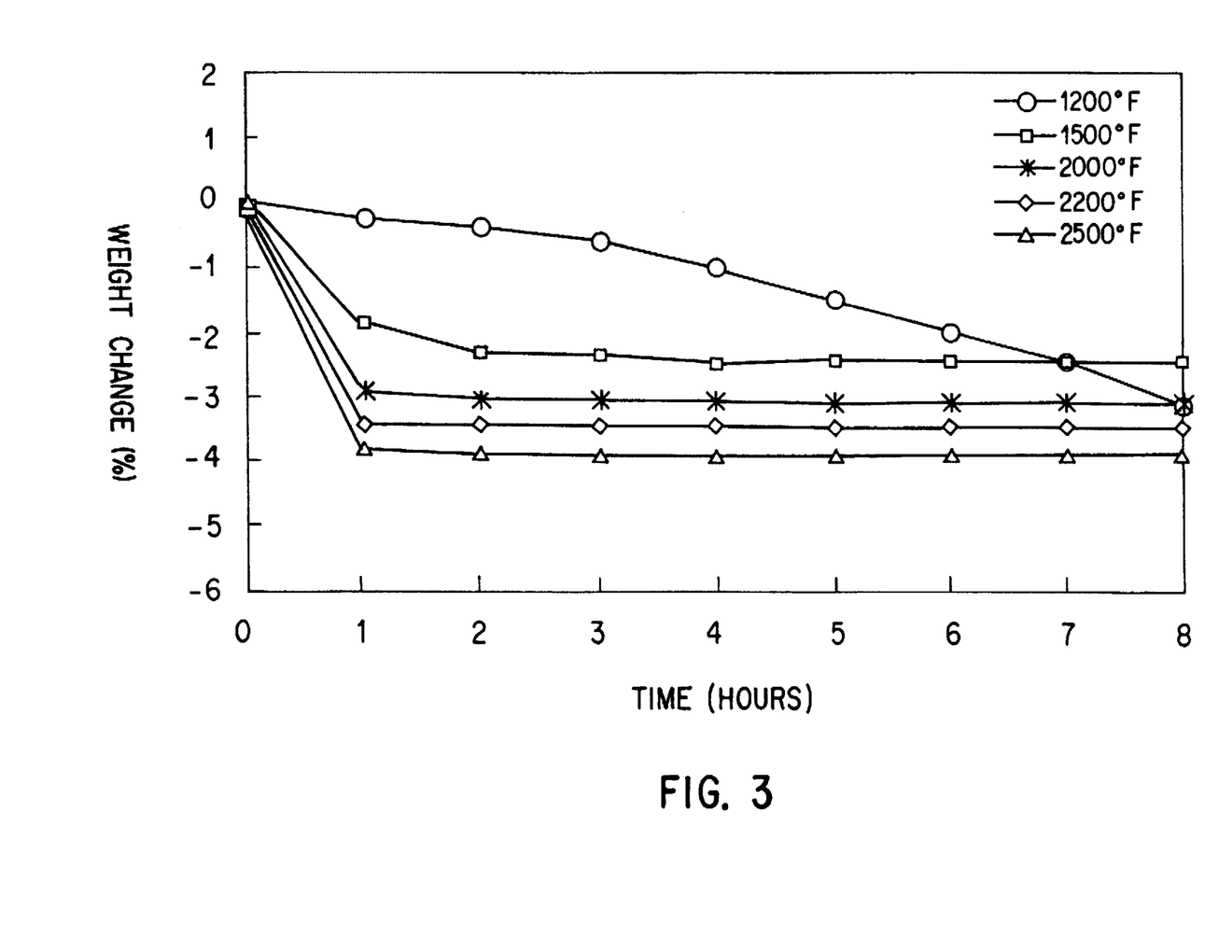
FIG. 3 is a graph demonstrating the weight change experienced over time by an uncoated, inhibited matrix SiC/C composite according to the present invention at various temperatures.
Figure 4:
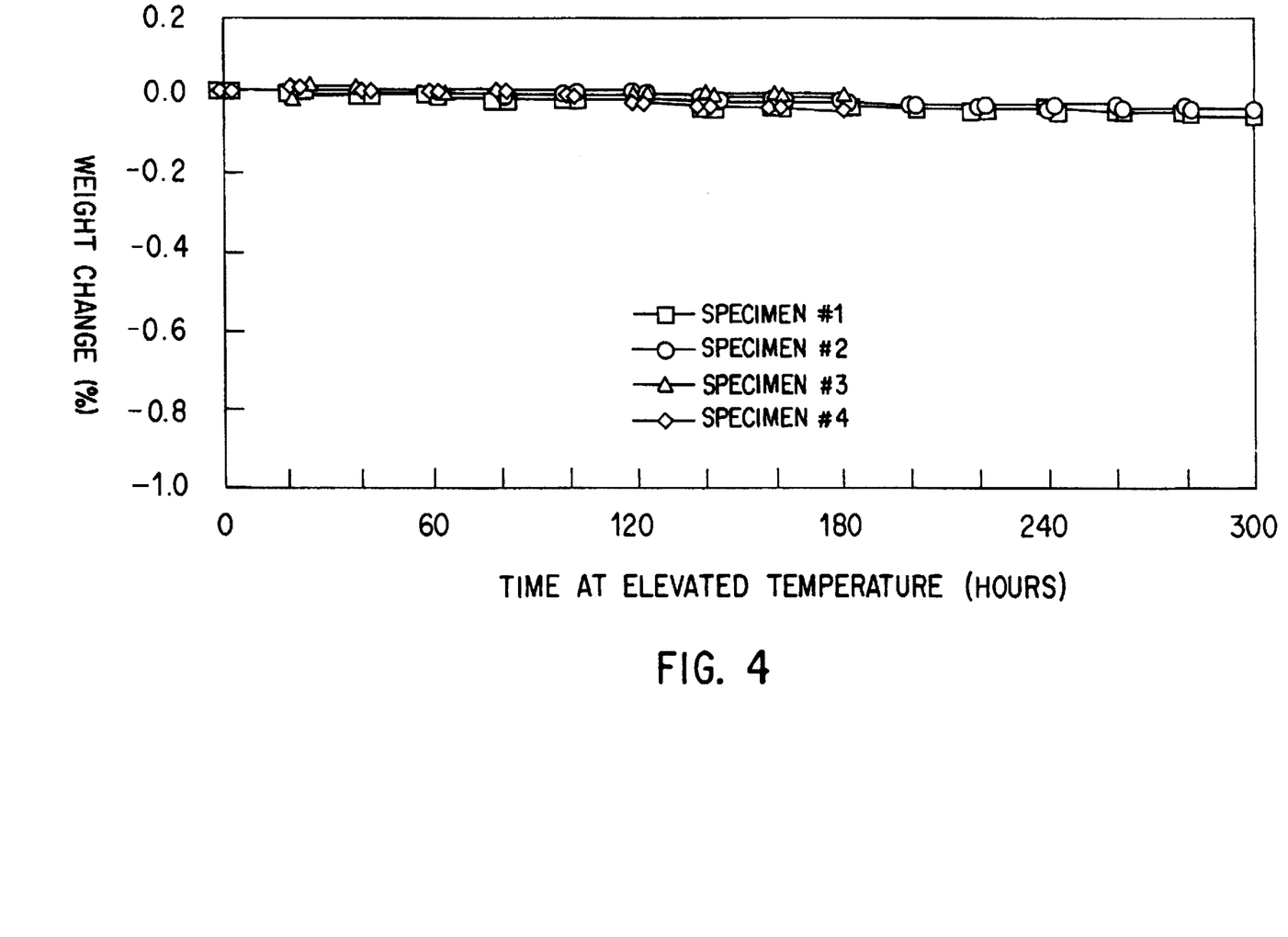
FIG. 4 is a graph demonstrating the weight change in air experienced over time by a coated, inhibited matrix SiC/C composite according to the present invention.

FIG. 3 further demonstrates the high temperature, oxidation resistant stability of the SiC/C composites according to the present invention. The precentage weight change of the uncoated, inhibited matrix SiC/C composite produced in Example 3 is demonstrated after aging in air at various temperatures from 1200° F. to 2500° F. FIG. 4 demonstrates the negligible weight change experienced by four specimens of inhibited matrix SiC/C composites according to the present invention, which include a siliconized SiC coating, after cyclic oxidation of up to 300 hours. The oxidation cycle utilized was two hours at 2200° F., 18 hours at 1200° F. and 16 hours at 95° F. and 95% humidity. A silicon nitride coated inhibited matrix SiC/C composite also showed negligible weight change after a cyclic oxidatin test of 200 hours in which the cycle was 2.5 hours at 2500° F., 2.5 hours at 2000° F., 10 hours at 1500° F. and 10 hours at 1200° F.

Figure 5:
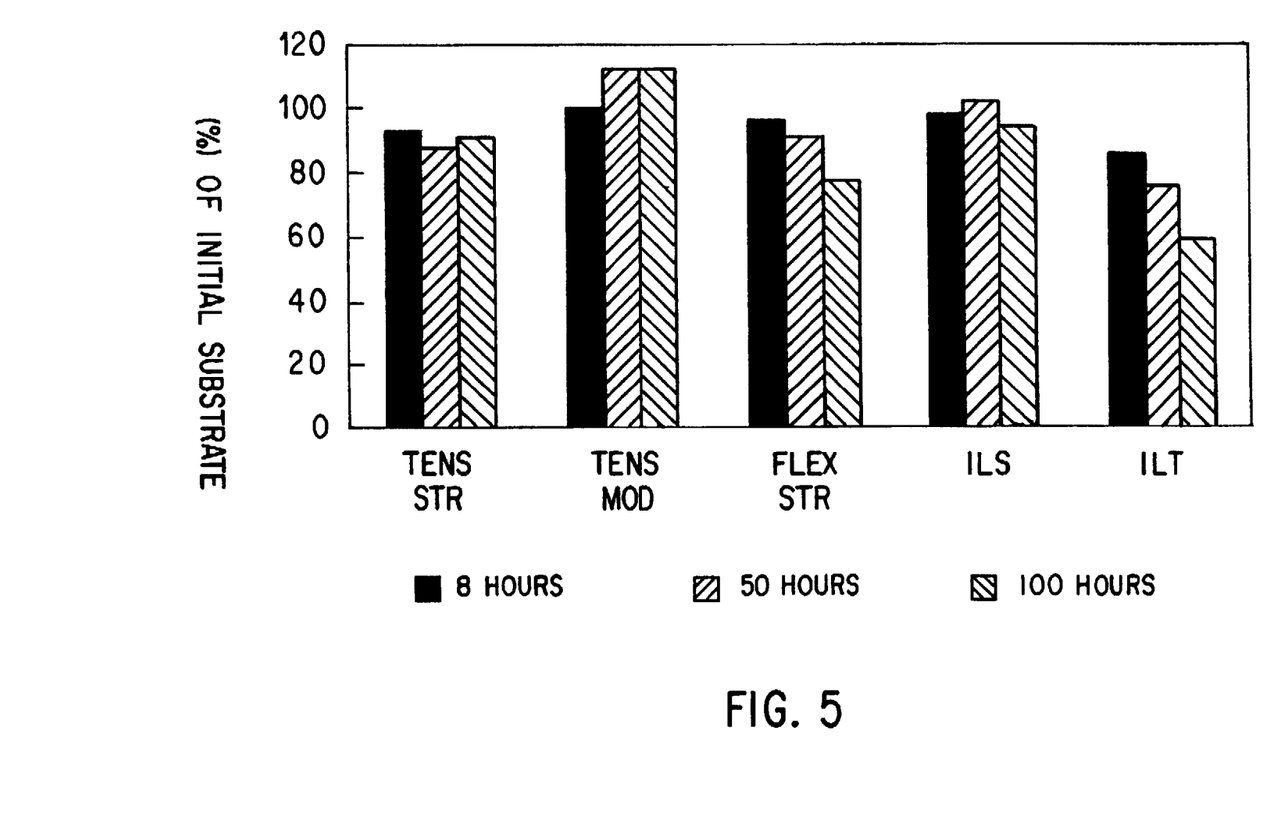
FIG. 5 is a graph demonstrating the residual properties of an uncoated, inhibited matrix SiC/C composite according to the present invention after exposure in air at 2200° F.
Figure 6:
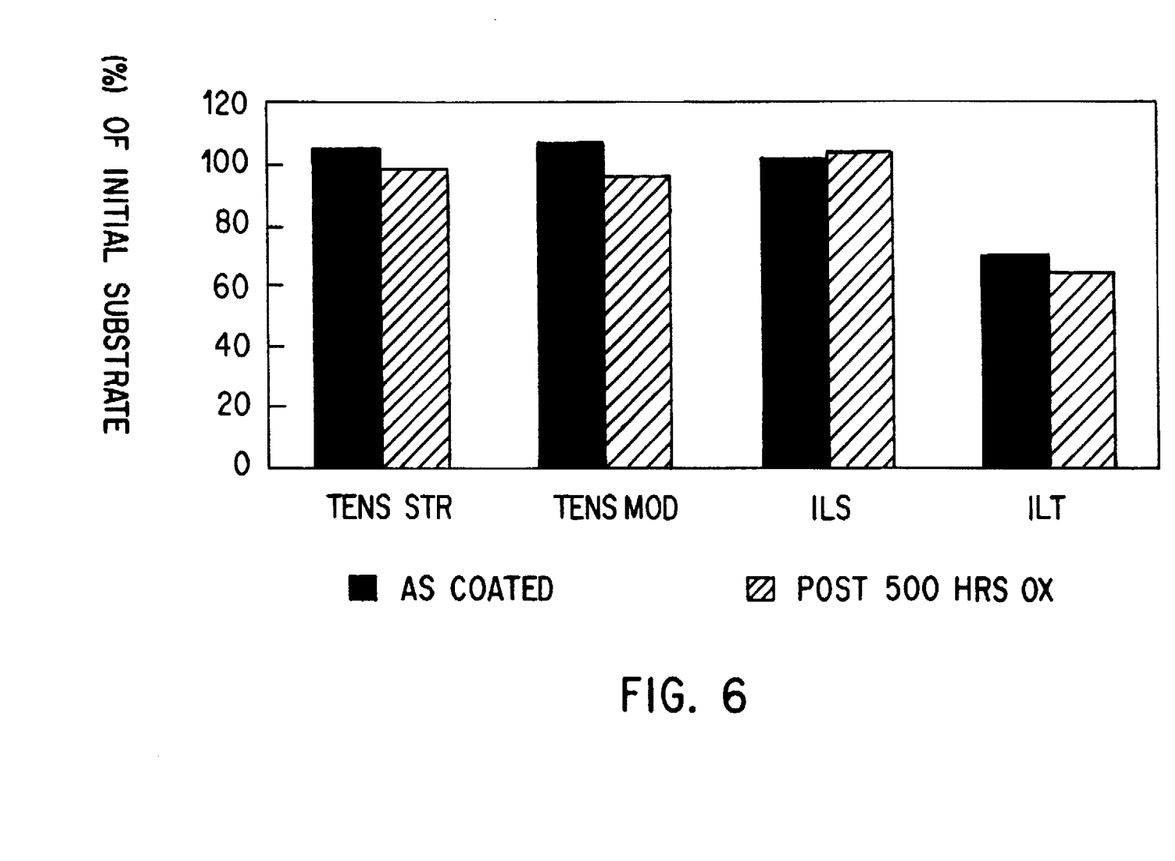
FIG. 6 is a graph demonstrating the residual properties of a coated, inhibited matrix SiC/C composite according to the present invention after cyclic oxidation testing.
Figure 7:
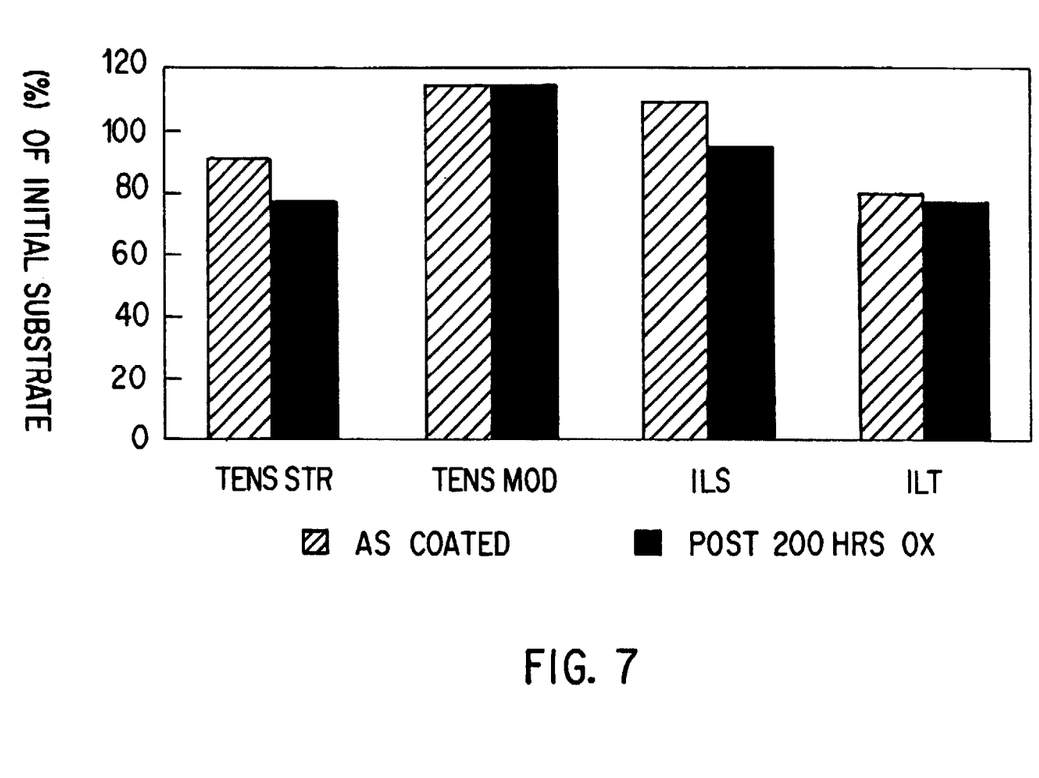
FIG. 7 is a graph demonstrating the residual properties of a coated, inhibited matrix SiC/C composite with a fiber coating according to the present invention, after cyclic oxidation testing.

FIGS. 5–7 demonstrate the properties which remain after extended testing of Nicalon SiC fiber reinforced carbon composites molded by autoclave and densified by carbon CVI.

FIG. 5 shows the retention of significant percentages of the initial values of tensile strength (TENS STR), tensile modulus (TENS MOD), flexural strength (FLEX STR), interlaminar shear strength (ILS) and interlaminar tensile strength (ILT) for an uncoated, inhibited matrix SiC/C composite.

FIG. 6 shows the excellent retention of such properties, by an inhibited matrix, SiC/C composite coated with siliconized silicon carbide, after 500 hours of a cyclic oxidation test in which the cycle was 2 hours at 2200° F., 18 hours at 1200° F., and 16 hours at 95° F. and 95% Relative Humidity.

FIG. 7 shows the excellent retention of such properties, by an inhibited matrix, carbon coated SiC fiber reinforced carbon composite coated with siliconized silicon carbide, after 200 hours of the cyclic oxidation test described for FIG. 6 above.

The inhibited SiC/C composites we have developed can be fabricated into large, complex shapes. Green composite fabrication can be carried out by traditional glass/epoxy molding techniques well known to the aerospace industry. Although C/C composites can be manufactured in a similar manner, they do not offer the high degree of oxidation resistance displayed by the inhibited SiC/C materials. Additionally, SiC/C composites are more compatible with ceramic coatings than C/C composites of similar strength, and have greater compressive and interlaminar properties than C/C composites.

It is apparent that the inventive process and materials provide an advancement in the art as described above. The foregoing examples and descriptions are meant to illustrate and not limit the invention, which includes all modifications and variations that fall within the scope of the following claims and their equivalent embodiments.

We claim:

1. An article comprising composite materials having oxidation resistance greater than inhibited carbon/carbon composite materials, including reinforcing fibers in a carbon matrix wherein said reinforcing fibers consist essentially of a plurality of silicon carbide containing fibers in said carbon matrix, wherein said carbon matrix contains about 2 to about 25 weight percent of an inhibitor selected from the group consisting of boron carbide, boron nitride, silicon tetraboride, silicon hexaboride, zirconium diboride, refractory metal borides of hafnium, vanadium, niobium, tantalum, chromium, molybdenum, tungsten, and mixtures thereof.

2. The article of claim 1 wherein said carbon matrix additionally contains a filler selected from the group consisting of carbon, silicon carbide, silicon nitride, and mixtures thereof.

3. The article of claim 1 wherein said article is coated with an inorganic ceramic material having a coefficient of thermal expansion match with said silicon carbide containing fibers.

4. The article of claim 3 wherein said inorganic ceramic material is selected from the group consisting of silicon, silicon carbide, silicon nitride, silicon triboride, silicon tetraboride, silicon hexaboride, boron carbide, aluminum phosphate, an aluminum silicate, a borosilicate, and mixtures thereof.

5. The article of claim 3, wherein said ceramic material is silicon carbide.

6. The article of claim 1 wherein said fiber is coated with a low modulus material.

7. The article of claim 6 wherein said low modulus material is selected from the group consisting of carbon and boron nitride.

8. The article of claim 1 wherein said inhibitor is boron carbide.

9. The article of claim 1, wherein said carbon matrix of said composite material is uncoated.

10. A net shaped composite material for structural applications having oxidation resistance greater than inhibited carbon/carbon composite materials comprising reinforcing fibers in a carbon matrix having about 2 to about 25 weight percent inhibitor, wherein said reinforcing fibers consist essentially of a plurality of silicon carbide containing fibers in said carbon matrix formed by impregnating said fibers with an organic resin and staging to form a prepreg, shaping and curing said prepreg to form a laminate, carbonizing said shaped laminate to form a carbonized part and densifying said carbonized part by chemical vapor infiltration to form a component, wherein prior to said carbonizing, said organic resin contains said inhibitor selected from the group consisting of boron carbide, boron nitride, silicon tetraboride, silicon hexaboride, zirconium diboride, refractory metal borides of hafnium, vanadium, niobium, tantalum, chromium, molybdenum, tungsten, and mixtures thereof.

11. The shaped material of claim 10 wherein said organic resin is selected from the group consisting of phenolic, epoxy, and furan.

12. The shaped material of claim 10 wherein said component contains an outer inorganic ceramic coating having coefficient of thermal expansion match with said silicon carbide containing fibers.

13. The shaped material of claim 12 wherein said coating is selected from the group consisting of silicon, silicon carbide, silicon nitride, silicon triboride, silicon tetraboride, silicon hexaboride, boron carbide, aluminum phosphate, an aluminum silicate, a borosilicate, and mixtures thereof.

14. The shaped material of claim 12, wherein said ceramic coating is silicon carbide.

15. The shaped material of claim 10 wherein said fibers are coated with a low modulus material.

16. The shaped material of claim 15 wherein said low modulus material is selected from the group consisting of carbon and boron nitride.

17. The shaped material of claim 10 wherein said inhibitor is boron carbide.

18. The shaped material of claim 10, wherein said carbon matrix of said composite material is uncoated.

19. An article comprising a plurality of silicon carbide containing fibers in an inhibited carbon matrix having about 2 to about 25 weight percent of a boron-containing carbon matrix inhibitor compound, wherein said carbon matrix comprises an organic resin containing said inhibitor and wherein said organic resin has been subjected to carbonization and thereafter to densification by chemical vapor infiltration of at least carbon.

20. The article of claim 19, wherein said boron containing compound is selected from the group consisting of boron, boron carbide, boron nitride, silicon tetraboride, silicon hexaboride, titanium diboride, zirconium diboride, refractory metal borides of hafnium, vanadium, niobium, tantalum, chromium, molybdenum, tungsten, and mixtures thereof.

21. The article of claim 20 wherein said boron containing compound is boron carbide.

22. The article of claim 19, wherein said carbon matrix additionally contains a filler.

23. The article of claim 22, wherein said filler is selected from the group consisting of carbon, silicon, silicon carbide, silicon nitride, and mixtures thereof.

24. The article of claim 19, wherein said article is coated with an inorganic ceramic material.

25. The article of claim 24, wherein said inorganic ceramic material is selected from the group consisting of silicon, silicon carbide, siliconized silicon carbide, silicon nitride, silicon triboride, silicon tetraboride, silicon hexaboride, boron carbide, aluminum phosphate, an aluminum silicate, a borosilicate, and mixtures thereof.

26. The article of claim 19, wherein said fiber is coated with a low modulus material.

27. The article of claim 26, wherein said low modulus material is selected from the group consisting of carbon and boron nitride.

28. The article of claim 19, wherein said carbon matrix of said composite materials is uncoated.

29. A shaped material for structural applications comprising a plurality of silicon carbide containing fibers in an inhibited carbon matrix having about 2 to about 25 weight percent of a boron containing carbon matrix inhibitor compound, said material being formed by impregnating said fibers with an organic resin containing said inhibitor and staging to form a prepreg, shaping and curing said prepreg to form a laminate, carbonizing said shaped laminate to form a carbonized part and densifying said carbonized part by chemical vapor infiltration to form a component.

30. The shaped material of claim 29, wherein said organic resin is selected from the group consisting of phenolic, epoxy, and furan.

31. The shaped material of claim 29, wherein said organic resin additionally contains a filler selected from the group consisting of carbon, silicon carbide, silicon nitride, silicon, or mixtures thereof.

32. The shaped material of claim 31, wherein said boron containing carbon matrix inhibitor compound is selected from the group consisting of boron, boron carbide, boron nitride, silicon tetraboride, silicon hexaboride, titanium diboride, zirconium diboride, refractory metal borides of hafnium, vanadium, niobium, tantalum, chromium, molybdenum, tungsten, and mixtures thereof.

33. The article of claim 32 wherein said boron containing compound is boron carbide.

34. The shaped material of claim 29, wherein said component contains an outer inorganic ceramic coating.

35. The shaped material of claim 34, wherein said ceramic coating is selected from the group consisting of silicon, silicon carbide, siliconized silicon carbide, silicon nitride, silicon triboride, silicon tetraboride, silicon hexaboride, boron carbide, aluminum phosphate, an aluminum silicate, a borosilicate, and mixtures thereof.

36. The shaped material of claim 29, wherein said fibers are coated with a low modulus material.

37. The shaped material of claim 36, wherein said low modulus material is selected from the group consisting of carbon and boron nitride.

38. The shaped material of claim 29, wherein said carbon matrix of said shaped material is uncoated.

39. A component for an aero engine comprising a composite material including reinforcing fibers in a carbon matrix, wherein said reinforcing fibers consist essentially of a plurality of silicon carbide containing fibers in the carbon matrix, wherein said carbon matrix is a carbonized phenolic resin containing about 2 to about 25 weight percent boron carbide inhibitor, and wherein the composite material has an interlaminar tensile strength of at least 1900 psi, and an interlaminar shear strength at least 4300 psi.

40. The component as in claim 39 wherein the resin contains the inhibitor prior to carbonization.

41. The component as in claim 40 wherein the matrix is densified with at least carbon by chemical vapor infiltration.

42. The component as in claim 41 wherein the component is coated with CVD SiC.

43. The component as in claim 42 wherein the component is selected from the group consisting of aero engine flaps, seals and liners.

44. The component of claim 39 wherein the composite material has an interlaminar tensile strength of at least 2000 psi, and an interlaminar shear strength of at least 5000 psi.

45. The component as in claim 44 wherein the matrix is densified with at least carbon by chemical vapor infiltration.

46. The component as in claim 45 wherein the composite material is coated with CVD SiC.

47. The component as in claim 46 wherein the component is selected from the group consisting of aero engine flaps, seals and liners.

48. The component as in claim 39 wherein the silicon carbide containing fiber is Nicalon fiber.

49. A structural part for a hypersonic vehicle comprising a composite material including reinforcing fibers in a carbon matrix, wherein said reinforcing fibers consist essentially of a plurality of silicon carbide containing fibers in the carbon matrix, wherein said carbon matrix is a carbonized phenolic resin containing about 2 to about 25 weight percent boron carbide inhibitor which has been densified with at least carbon by chemical vapor infiltration, and wherein the composite material has an interlaminar tensile strength of at least 1900 psi, and an interlaminar shear strength at least 4300 psi.

50. The part as in claim 49 wherein the resin contains the inhibitor prior to carbonization.

51. The part as in claim 50 wherein the part is coated with CVD SiC.

52. The part as in claim 51 wherein the part is selected from the group consisting of bolts, fasteners, skins and leading edges.

53. The part as in claim 50 wherein the composite material has an interlaminar tensile strength of at least 2000 psi, and an interlaminar shear strength of at least 5000 psi.

54. The part of claim 50 wherein the composite material has an interlaminar tensile strength of at least 3000 psi, and an interlaminar shear strength of at least 5000 psi.

55. The part as in claim 49, wherein the silicon carbide containing fiber is Nicalon fiber.

56. A thermal protection material comprising a composite material including reinforcing fibers in a carbon matrix, wherein said reinforcing fibers consist essentially of a plurality of silicon carbide containing fibers in the carbon matrix, wherein said carbon matrix is a carbonized resin containing about 2 to about 25 weight percent of a boron containing carbon matrix inhibitor compound which has been densified with at least carbon by chemical vapor infiltration, and wherein the composite material has an interlaminar tensile strength of at least 1000 psi, and an interlaminar shear strength at least 2500 psi.

57. The thermal protection material as in claim 56 wherein the resin is selected from the group consisting of phenolic, epoxy and furan.

58. The thermal protection material as in claim 57, wherein the resin contains boron carbide powder inhibitor prior to carbonization.

* * * * *